(12) United States Patent
Schuster et al.

(10) Patent No.: US 8,458,039 B1
(45) Date of Patent: *Jun. 4, 2013

(54) INCLUSION OF ITEMS IN A DATA FEED

(75) Inventors: Brian Schuster, Seattle, WA (US); Mohit Gupta, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 547 days.

This patent is subject to a terminal disclaimer.

(21) Appl. No.: 12/608,664

(22) Filed: Oct. 29, 2009

(51) Int. Cl.
*G06Q 30/00* (2012.01)

(52) U.S. Cl.
USPC .......................................... 705/26.1

(58) Field of Classification Search
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 6,029,141 | A * | 2/2000 | Bezos et al. ................. | 705/27.1 |
| 2006/0106665 | A1 * | 5/2006 | Kumar et al. .................. | 705/10 |
| 2006/0173985 | A1 * | 8/2006 | Moore .......................... | 709/223 |
| 2007/0038567 | A1 * | 2/2007 | Allaire et al. .................. | 705/50 |
| 2008/0077475 | A1 * | 3/2008 | McElhiney et al. ............. | 705/10 |
| 2010/0131455 | A1 * | 5/2010 | Logan et al. .................. | 707/602 |
| 2010/0223107 | A1 * | 9/2010 | Kim et al. ....................... | 705/10 |

OTHER PUBLICATIONS

No Author, "Internet Content Syndication: Content Creation and Distribution in an Expanding Internet Universe", Internet Content Syndication Council, White Paper, May 2008.*

Villano, Matt "Interland Rewards Affiliates for Referrals", CRN n1082 pp. 37, Feb. 9, 2004. Retreived from Dialog File: 15, Acc#: 02689586.*

* cited by examiner

*Primary Examiner* — Naeem Haq
(74) *Attorney, Agent, or Firm* — Thomas Horstemeyer, LLP (57) ABSTRACT

This document relates to the re-inclusion of items in a data feed. For example, a feed of items is sent to a referral network site. The feed includes some of the items sold through an electronic commerce network site. The referral network site refers a plurality of customers to the electronic commerce network site. One of the items excluded from the feed is identified and a forecast of sales through the electronic commerce network site is generated therefor. The forecast of sales specifies a number of the one of the items projected to be sold that are subject to a referral from the referral network site. A determination is made as to whether to include the one of the items in the feed based at least in part upon the forecast of sales.

20 Claims, 5 Drawing Sheets

INCLUSION OF ITEMS IN A DATA FEED

BACKGROUND

For merchants that sell products on the Internet, it can be useful to have other network sites help drive traffic to the network site of the merchant in order to increase sales. Such other network sites may be paid a referral fee or other fee by the merchant for each customer that is directed to the network site of the merchant. Such other network sites may comprise comparison shopping sites that compare the prices of multiple merchants for various items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
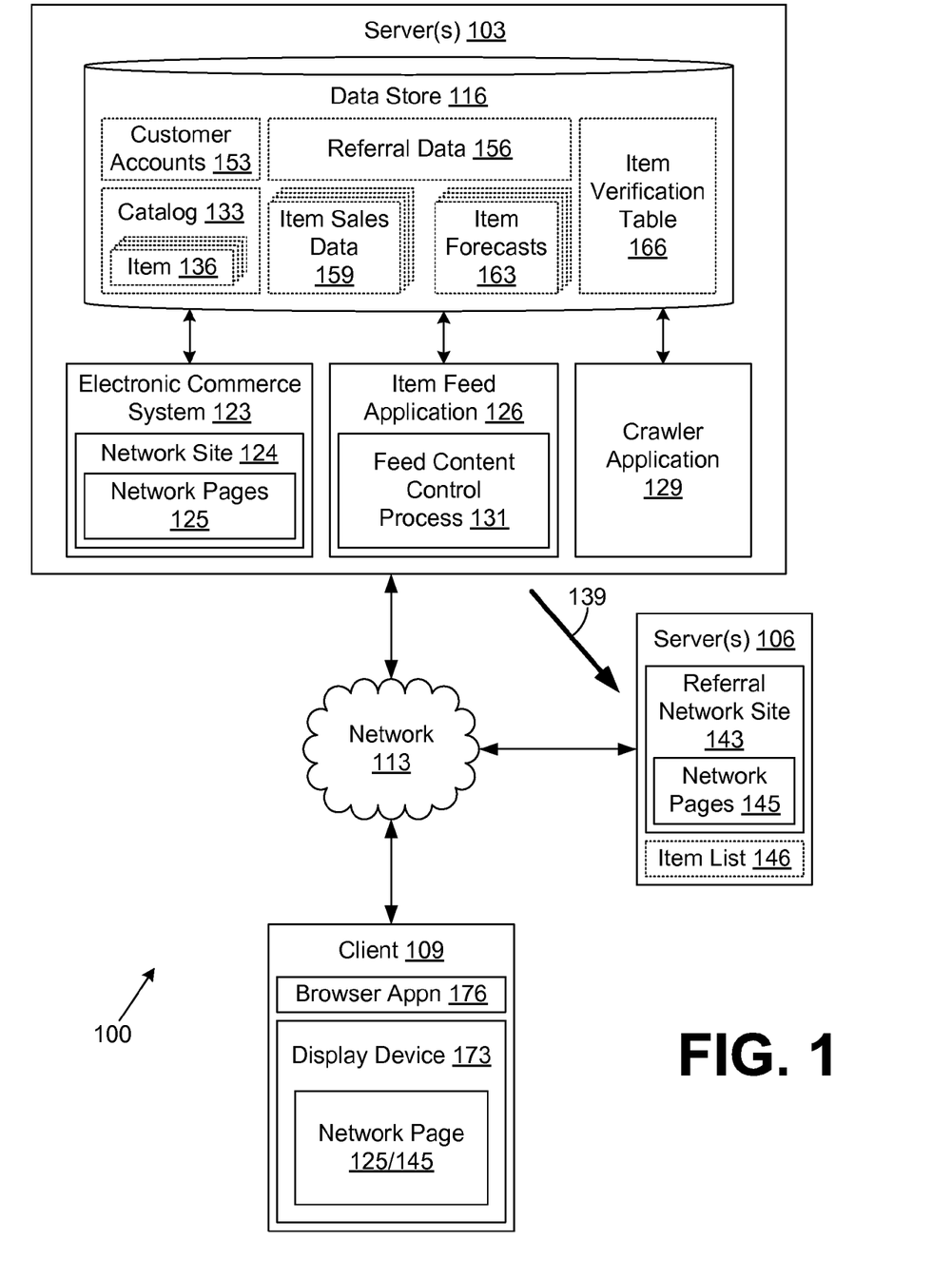
FIG. 1 is a drawing of a networked environment that includes servers and a client according to an embodiment of the present disclosure.

With reference to FIG. 1, the following relates to the transmission of data to network site such as a comparison shopping site in a networked environment 100 in association with the activities of a merchant that sells goods and/or services online over a network such as the Internet or other network. In the following discussion, first a description of the physical nature of the networked environment 100 is provided, followed by a description of the operation of the same. A more detailed discussion of various aspects is provided with respect to later figures.

The networked environment 100 depicted in FIG. 1 includes various computing devices such as, for example, one or more servers 103, one or more servers 106, one or more clients 109, and/or other computing devices that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, each of the servers 103, 106 and the client 109 are referred to herein in the singular. However, it is understood that in one embodiment, each of the servers 103, 106 may represent a plurality of servers. Also, the client 109 may represent a plurality of clients.

Each of the servers 103 and/or 106 comprises one example of a computing device that may be employed to execute various components as described herein. Each of the servers 103 and/or 106 may comprise, for example, a server computer or like system, and may represent multiple servers arranged, for example, in one or more server banks or other arrangements. Such servers may be located in a single installation or may be dispersed among many different geographical locations. To this end, each of the servers 103 and/or 106 may be viewed as a server "cloud" that represents the computing capacity of multiple servers, etc.

Various applications and/or engines are executed in the server 103 according to various embodiments. Also, various data may be stored in a data store 116 that is accessible to the server 103. The data stored in the data store 116, for example, may be associated with the operation of the various systems, applications, and/or processes described below. The systems and applications executed in the server 103 may include, for example, an electronic commerce system 123, an item feed application 126, a crawler application 129, and potentially other systems and applications. Among other functions, the electronic commerce system 123 includes a network site 124 as will be described. The item feed application 126 includes a feed content control process 131 as will be described. In addition, other systems, applications, and/or processes may be implemented in the server 103 that are not discussed in detail herein.

The electronic commerce system 123 is configured to conduct electronic commerce to facilitate the network presence of one or more online merchants through the network site 124. Thus, the electronic commerce system 123 operates one or more network sites 124 such as web sites on the Internet that facilitate electronic commerce. The electronic commerce system 123 may comprise many different applications, components, and/or systems implemented on a plurality of computing devices such as the server 103 that are located at one site, or are distributed among geographically diverse sites as can be appreciated.

The applications and/or components that make up the electronic commerce system 123 provide for various functions to facilitate electronic commerce such as maintaining and accessing a catalog 133 in which is stored data describing a plurality of items 136 such as products sold to customers by an online merchant. The data describing each of the items 136 may include item images and other information. The items 136 sold through the electronic commerce system 123 may comprise, for example, goods and/or services.

The electronic commerce system 123 may also facilitate various functions associated with the operation of the network site 124 such as, for example, generating network pages 125 that provide for searching for items 136 and presenting search results for such items 136. Such network pages 125 may also present detailed information about items 136 and may facilitate the purchase of items 136 by providing for payment for items 136 and facilitating other functions. Thus, in providing for the purchase of items 136, the electronic commerce system 123 implements one or more network sites 124 that generate a plurality of different network pages 125 such as web pages or other network content that is served up to various clients 109 controlled by customers. Such network pages 125 may be static and/or created dynamically.

The item feed application 126 is executed in the server 103 in order to generate a feed 139 that comprises a listing of the items 136 that is sent to a referral network site 143 implemented on the server 106. The referral network site 143 functions to refer clients 109 to the network site 124 and other sites as will be described. The referral network site 143 generates and serves up network pages 145 to clients 109 as will be described.

The information included in the feed 139 is stored in association with the operation of the referral network site 143 as item list 146. The crawler application 129 is executed in the server 103 in order to ensure that the referral network site 143 takes proper action with respect to the items 136 listed in the feed 139 after it is received at the referral network site 143.

In addition, various customer accounts 153 may be maintained in the data store 116. Such customer accounts 153 may include customer data that describes the customer including payment addresses, delivery addresses, payment instruments, and other data used to consummate various commercial transactions. Also associated with each of the customer accounts 153 are browse histories, purchase histories, and potentially other data.

Also stored in the data store 116 are referral data 156, item sales data 159, item forecast data 163, an item verification table 166, and potentially other data. The referral data 156 includes data that tracks when a client 109 has requested a network page 125 from the network site 124 based upon a referral from the referral network site 143 as will be described. The items sales data 159 tracks the number of each of the items 136 that are sold over time through the electronic commerce system 123 as well as other information about the sales of items 136. The item forecast data 163 includes sales forecasts generated for each of the items 136 that are generated based on various factors such as past sales performance and other factors. The item verification table 166 is used to track whether items 136 included in the feed 139 appear on respective network pages 145 generated by the referral network site 143 as expected. The various data stored in the data store 116 may be stored or accessed by the electronic commerce system 123, the item feed application 126, the crawler application 129, or other applications and systems as can be appreciated.

As mentioned above, the server 106 is employed to implement the referral network site 143. In one embodiment, the referral network site 143 provides for comparison shopping and is configured to generate and serve up network pages 145 that include listings of multiple offerings for various items 136 from multiple different merchants as will be described. The item list 146 includes information about each of the items 136 included in the feed 139 sent to the referral network site 143. Such information may include all or a portion of the information contained about such items 136 in the catalog 133.

The client 109 is representative of a plurality of client devices that may be coupled to the network 113. For example, the client 109 may comprise one of millions of clients 109 coupled to the Internet. The client 109 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability.

The client 109 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 109 are various applications including a browser application 176. The client browser application 176 is configured to interact with the electronic commerce system 123 and potentially other applications on the server 103 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 176 may comprise some other type of interface application with like capability. When executed in the client 109, the browser application 176 is configured to render network pages 125/145 such as, for example, web pages and the like on the display device 173 and to perform other functions. Also, the browser application 176 may implement the execution of active portions of the network pages 125/145 as can be appreciated.

Next, a general description of the operation of the various components described above in the networked environment 100 is provided. The electronic commerce system 123 is configured to conduct electronic commerce with various customers through clients 109 over the network 113 as described above. To this end, the electronic commerce system 123 implements a network site 124 through which items 136 are sold to customers as can be appreciated. Such items 136 are stored in the catalog 133 as described above. In conducting electronic commerce with various clients 109, the electronic commerce system 123 may serve up various network pages 125 that serve various purposes as mentioned above.

The sales of items 136 through the electronic commerce system 123 may occur through any one of multiple channels. One such channel involves sales that originate through a referral from a respective referral network site 143. Another channel involves direct sales consummated by the electronic commerce system 123 without a referral. In addition, sales of items 136 may involve other channels. Thus, a channel as contemplated herein refers to a mode in which the sale of an item 136 was originated or consummated.

As mentioned above, in one embodiment, the referral network site 143 implemented on the server 106 refers customers to the network site 124 associated with the electronic commerce system 123 to potentially consummate a purchase of an item 136.

Figure 2:
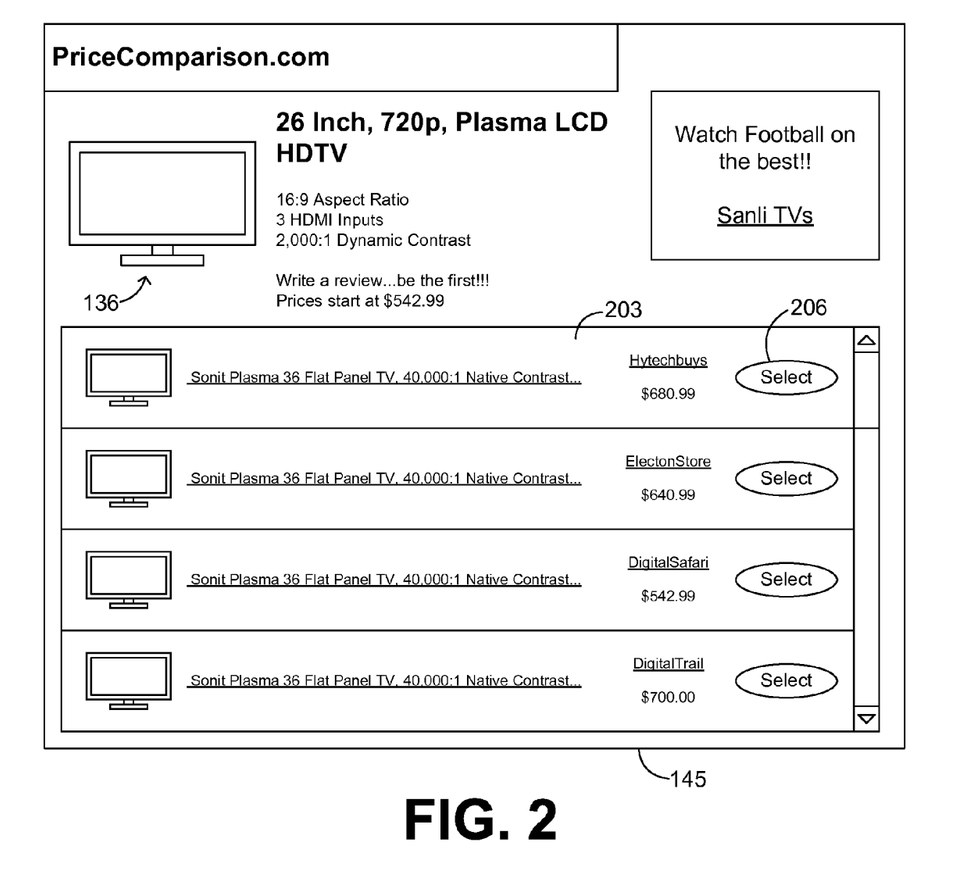
FIG. 2 is a drawing of a network page generated by a network site hosted on one of the servers in the networked environment of FIG. 1 according to an embodiment of the present disclosure.

To explain further, reference is made to FIG. 2, in which one example is shown of a network page 145 generated by the referral network site 143 (FIG. 1). The network page 145 is one example of many different network pages 145 generated by the referral network site 143, where the referral network site 143 provides for price comparison shopping. Examples of such price comparison sites include www.shopzilla.com, www.shopping.com, and other such sites. To this end, the network page 145 displays an item 136 along with a basic description of the item 136. A more detailed description of the item 136 may also be displayed, or links, tabs, or other connections to a more detailed explanation may be included, etc. In addition, the network page 145 displays a number of merchant offerings 203 for the respective item 136. To this end, a user is able to specify a given item 136 that they wish to purchase on the referral network site 143 by performing a product search or by navigating through a taxonomy as can be appreciated. The user may then cause the referral network site 143 to generate the network page 145 that sets forth the merchant offerings 203 for the respective item 136. The user can then compare the various merchant offerings 203 for the item 136 and select the offer they favor the most. Associated with each merchant offering 203 is a link 206 that directs the customer to a respective site of a corresponding merchant. One of the links 206 directs the customer to the network site 124 (FIG. 1) of the merchant that operates the electronic commerce system 123 (FIG. 1) described above. Each of the links 206 may be embodied in the form of a "select" button or other component as can be appreciated. If a user wishes to pursue a purchase of the item 136 based on a respective merchant offering 203, then the user may click on the respective button or other component associated with such merchant offering 203 to be referred to the merchant site.

Referring back to FIG. 1, upon manipulating the link 206, the user is referred to a network page 125 (FIG. 1) generated by the network site 124 that comprises, for example, a detail page presenting the item 136 with the ability to place such item into a shopping cart and proceed to checkout in order to purchase such item 136 or take other action. In order to cause the network site 124 to generate the respective network page 125 that comprises a detail page presenting the respective item 136 viewed in the network page 145, the link 206 causes a browser application 176 (FIG. 1) to generate a request for the specific network page 125 that comprises the detail page presenting the item 136 as can be appreciated.

Such a request includes information indicating that the request is based upon a referral from the respective referral network site 143. The electronic commerce system 123 is configured to store all of the referrals received from referral network sites 143 for each of the items 136 in the referral data 156 (FIG. 1). Thus, over time, the electronic commerce system 123 will store all of the referrals received from referral network sites 143 in the data store 116 (FIG. 1) for future reference in determining whether items 136 are to be included in the feed 139 (FIG. 1) as will be described.

In some situations, there may be a commercial relationship established between the operator of a referral network site 143 and a merchant who operates the electronic commerce system 123. For example, the merchant operating the electronic commerce system 123 may pay the operator of a referral network site 143 a predefined fee for each referral received. Alternatively, the merchant and the operator of the referral network site 143 may agree that the merchant is to pay the operator a predefined percentage of the sales price for all items 136 sold based upon a referral received from the referral network site 143.

In this respect, the parties may generate mutually beneficial relationships such that the merchant receives the benefit of extra traffic driven to the network site 124, and the operator of the referral network site 143 receives the benefit of having more items 136 to list and more merchant offerings 203 (FIG. 2) to show in various comparisons for various items 136 as described above. In addition, there may be other terms specified between the parties for the referral activity.

A number of referrals may be tracked in both the server 103 by the respective merchant and in the server 106 by the respective operator of the referral network site 143 so that precise amounts owed based upon referrals as described above can be determined. Similarly, the number of sales based upon a referral may be maintained in the server 103 in the item sales data 159 (FIG. 1) so that appropriate amounts may be calculated to pay to the operator of the referral network site 143 as can be appreciated.

In order to provide the operator of the referral network site 143 with the information needed to present the merchant offering 203 with respect to items 136, the item feed application 126 is executed in the server 103 in order to generate the feed 139 that includes a subset of the total number of items 136 stored in the catalog 133. The feed 139 includes a listing of a subset of all of the items 136 contained in the catalog 133 that have been selected or otherwise designated to send to the referral network site 143. The information contained in the feed 139 for each of the items 136 included therein may comprise selected details about such items 136 including item images, product descriptions, product feedback ratings, and other information as can be appreciated.

The feed 139 may be sent from the item feed application 126 to the referral network site 143 periodically in such a manner so as to maintain the most up-to-date item list 146 in the referral network site 143. For example, the feed 139 may be sent weekly, daily, every few hours, or any other appropriate time interval as can be appreciated. In one embodiment, the feed 139 may include a description of all items 136 included therein in a complete listing. In other embodiments, the feed 139 may only include such information that has changed relative to a prior feed 139 sent previously. For example, such information may include any changed prices, or other aspects of the items 136 that have been sent to the referral network site 143 in a prior feed 139.

The feed content control process 131 is executed as a portion of the item feed application 126 in order to determine whether items 136 are to be included in the feed 139. Also, from time to time, the feed content control process 131 determines whether items 136 that have been previously excluded from the feed 139 should be reintroduced or re-included. To this end, the feed content control process 131 may be configured to determine whether to reintroduce or re-include one or more of the items 136 that were previously excluded. Such a determination may be made upon an occurrence of at least one circumstance that renders obsolete a prior determination of exclusion of the one or more items 136 from the feed 139.

Such a circumstance may comprise an event or a pending event in the future that would cause a change in consumer habits with respect to purchases of a given item 136. For example, in the holiday shopping season in the fall, it may be that items 136 are sold at a more rapid pace, where more of such items 136 will want to be included into the feed 139. In addition, other holidays may occur where sales for various items 136 tend to increase during such periods of time. Such circumstances may render obsolete a prior determination that a given item 136 should be excluded from the feed 139 due to the lack of sales or other reason as will be described.

Figure 3:
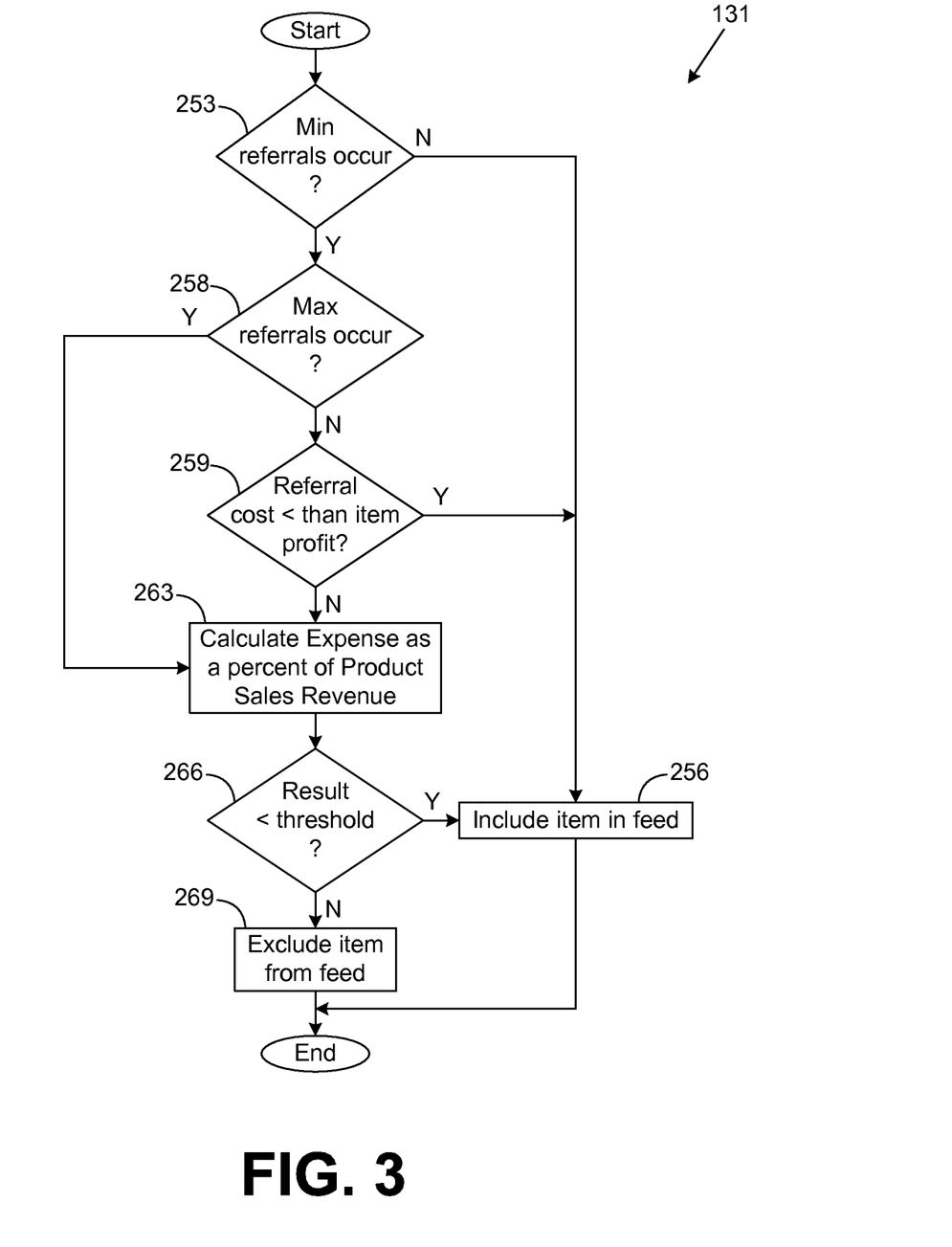
FIG. 3 is a drawing of a flowchart that illustrates example functionality of a feed content control process implemented in one of the servers in the networked environment of FIG. 1 according to an embodiment of the present disclosure.

With reference next to FIG. 3, shown is a flowchart that illustrates one example of an exclusion process portion of the feed content control process 131 that is executed to determine whether given items 136 (FIG. 1) should be excluded from the feed 139 (FIG. 1) to the referral network site 143 (FIG. 1) as described above. Alternatively, the flowchart of FIG. 3 may be viewed as depicting steps of a method implemented in the server 103 (FIG. 1) according to various embodiments. The exclusion process portion of the feed content control process 131 depicted in FIG. 3 is implemented with respect to each item 136 to determine whether such items 136 should be included in the feed 139.

To begin, in box 253, the feed content control process 131 determines whether a minimum number of referrals stored as the referral data 156 (FIG. 1) for a respective item 136 has occurred over a prior predefined period of time. Such period of time may comprise, for example, a number of weeks stretching into the past from the present time. For example, the time period may comprise the last seven weeks or other number of weeks as can be appreciated. The period of time may be of any length measured in terms of years, months, weeks, days, hours, or any other period of time. If a minimum number of referrals has not occurred for a given item 136 over the last specified period of time, then the feed content control process 131 proceeds to box 256 in which the item 136 is included in the item feed 139.

This is because if a minimum number of referrals have not occurred, then it may be that the item 136 needs to be made available on the referral network site 143 for an additional period of time due to the fact that such item 136 is in the initial stages of being offered to customers and interest in the item 136 has not matured. Alternatively, there may be other reasons why the number of referrals falls below a predefined minimum threshold. Given that the number of referrals falls below a given minimum threshold, then it is assumed that the marketing cost represented by such referrals is also minimal, thereby justifying placement of the respective item 136 into the feed 139 as little cost is incurred. However, if the marketing cost due to referrals increases such that it is unwarranted relative to the number of sales of a given item 136, then a closer look may be deemed necessary as will be described. In box 256, as mentioned above, the feed content control process 131 includes the item in the feed 139. Thereafter, the feed content control process 131 ends with respect to the item 136 under consideration.

Assuming that the minimum number of referrals has occurred over the last predefined period of time as determined in box 253, then the feed content control process 131 proceeds to box 258 as shown. In box 258, if a predefined maximum number of referrals has not occurred over the last predefined period of time, then the feed content control process 131 proceeds to box 259. Otherwise, the feed content control process 131 skips to box 263. The maximum number of referrals specified may be, for example, 100 referrals or some other number to limit marketing expenditure for items having large profit margins and for other reasons.

In box 259, it is determined whether the marketing cost due to the referrals that occurred over the last period of time is less than the profit associated with the sale of one unit of the item 136 considered. The profit may be determined for a respective item 136 by viewing accounting data maintained for such item 136 as can be appreciated. Assuming that the marketing cost with respect to referrals for a specific item 136 is less than the profit that is obtained by the sale of one of such items 136, then the feed content control process 131 proceeds to box 256 in order to include the item in the feed 139. Thus, the item 136 is included in the feed 139 if the cost for the referrals received from the referral network site 143 is less than the profit that would be realized by the sale of one item 136.

On the other hand, if the cost of referrals is greater than the profit from the sale of one item 136, then the feed content control process 131 proceeds to box 263 to calculate the marketing expenses presented by the referrals over the prior period of time as a percent of total item sales revenue for a given item 136. This serves to act as a limit upon the marketing expenditure for a given item 136 through referrals from referral network sites 143. The total item sales revenue is a figure that equals the total amount received due to sales of a given item 136 over the past predefined period of time.

For example, assume that a quantity of ten of a given item 136 has been sold over the last prior period of time as described above. Also assume that the unit price for the item 136 is $1,000. Further assume that there have been 5,667 referrals for such item 136 from a respective referral network site 143 over the same period of time. Further assume that the referral network site 143 is to be paid 15 cents for each referral received by the merchant operating the electronic commerce system 123. As such, then the total marketing expense due to the referrals is $850.05. Since ten of the items 136 have been sold at a price of $1,000 each, then the total item sales revenue is equal to $10,000. Thus, to calculate the marketing expense due to the referrals as a percent of the item sales revenue, one may divide $850.05 by $10,000 to obtain a percentage of approximately 8.5.

Once the marketing expense due to the referrals is calculated as a percent of the item sales revenue as described above, then the feed content control process 131 proceeds to box 266 to determine whether the percentage calculated is less than a predefined threshold for the respective item 136. For example, the threshold may be specified as 5%, 7%, or some other percentage. There may be several different percentage thresholds specified for various different items 136 due to the differing prices of such items 136. For example, for some items 136 having a higher profit margin, a greater percentage threshold may be specified. For other items 136 having a relatively lower profit margin, a lower threshold may be warranted. In the end, the percentage threshold specified for a respective item 136 is application specific. Note that different thresholds may be specified for different items 136 or categories of items 136 as can be appreciated.

Assuming that the percentage calculated in box 263 is less than a given threshold, then the feed content control process 131 proceeds to box 256 to include the respective item 136 in the feed 139. Otherwise, the feed content control process 131 proceeds to box 269 and excludes such item 136 from the feed 139. Thus, if an item is excluded in box 269, then it has effectively passed through three different exclusion rules or tests as specified in boxes 253, 259, and 266. Stated another way, the exclusion process described involves the application of exclusion rules to the respective item 136. It should be understood that other rules may be included in the process described above in determining whether a given item 136 is to be included in a given feed 139. Assuming that an item 136 is included in box 256 or excluded in box 269, the feed content control process 131 ends this portion with respect to the item 136 considered as shown.

Figure 4:
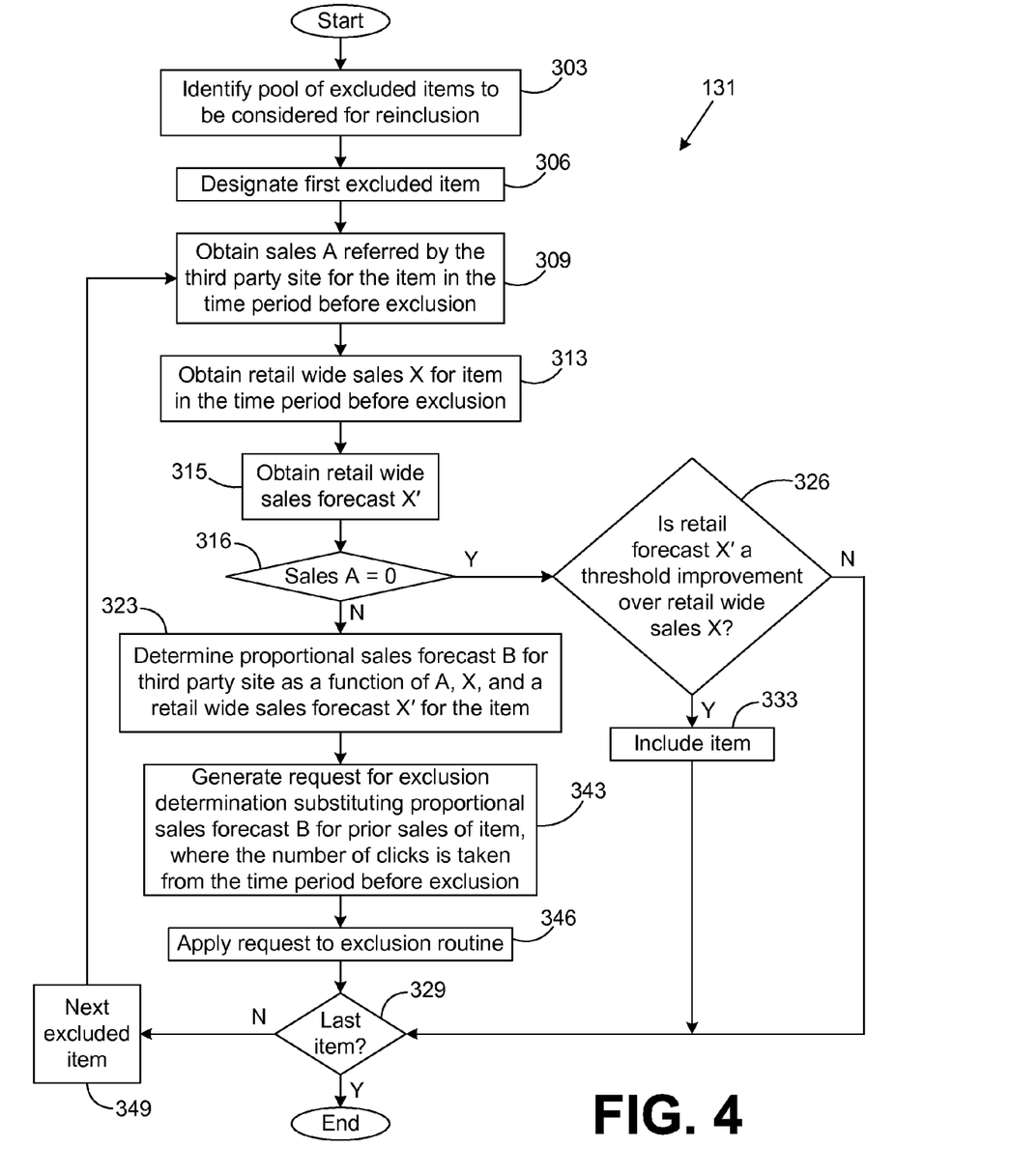
FIG. 4 is a drawing of a flowchart that illustrates additional functionality of a feed content control process implemented in one of the servers in the networked environment of FIG. 1 according to an embodiment of the present disclosure.

With reference next to FIG. 4, shown is a flowchart that provides further illustration of another portion of the feed content control process 131 according to various embodiments. Alternatively, the flowchart of FIG. 4 may be viewed as depicting steps of a method implemented in the server 103 (FIG. 1) according to various embodiments. The functionality depicted in the flowchart of FIG. 4 is implemented with respect to individual items 136 (FIG. 1) that have previously been excluded from the feed 139 (FIG. 1) that was sent to the referral network site 143 (FIG. 1). Specifically, when it is decided to exclude an item 136 from the feed 139 as was described above with reference to the flowchart of FIG. 3, from time to time it may be desirable to consider whether such excluded item 136 should be reintroduced or re-included in the feed 139. This may be because circumstances that gave rise to the decision to exclude the item 136 may have changed such that the prior determination of exclusion of the item 136 potentially lacks relevance to current circumstances or events. For example, such circumstances may comprise the occurrence of an event or pending occurrence of a future event that mandates that such item 136 should be considered for re-inclusion in the feed 139. For example, if the event is the beginning of a holiday shopping season, then it may be that the exclusion of the item 136 should be reconsidered as sales may pick up as the holidays draw near. Similarly, other holidays and events may mandate a change in the stance as to whether an excluded item 136 should be re-included in the feed 139. Stated another way, such circumstances or events may render obsolete a prior determination of exclusion for a given item 136 from the feed 139.

Thus, to determine whether a previously excluded item 136 should be re-included into the feed 139, the feed content control process 131 begins in box 303 to identify one or more excluded items 136 that are to be considered for re-inclusion in the feed 139. Thereafter, in box 306, the first one of the excluded items 136 is designated for particular consideration. Then, in box 309, the quantity of sales of the item 136 subject to a referral by the referral network site 143 that occurred in the time period prior to the exclusion of the item 136 is obtained. Such information may be stored in the data store 116 (FIG. 1) or in some other location accessible to the server 103 (FIG. 1) as can be appreciated.

Next, in box 313, the feed content control process 131 obtains a number indicating the retail wide sales X of the respective item 136 in a time period occurring just before such item 136 was excluded from the feed 139. Retail wide sales X of the given item 136 through the electronic commerce system 123 involve sales through multiple channels including those sales subject to a referral from the referral network site 143. For example, such retail wide sales X of an item 136 may include sales of the item 136 directly from the electronic commerce system 123 (FIG. 1) to a client 109 (FIG. 1) without a referral or other involvement from a third party. In one embodiment, the retail wide sales X comprise all sales of an item 136 through all channels. Alternatively, the retail wide sales X may comprise the sales through a subset of all of the channels.

In box 315, the retail wide sales forecast X' of the respective item 136 through the electronic commerce system 123 is obtained for a future period of time. The retail wide sales forecast X' may be calculated for all of the channels, or a subset of channels. In one embodiment, the channels of sales for which the retail wide sales forecast X' is determined are the same as the channels specified for the determination of the actual retail wide sales X in box 313 for the period of time prior to the exclusion period. Such a forecast X' may be calculated in any number of ways as can be appreciated.

Next, in box 316, the feed content control process 131 determines whether the sales of the respective item 136 in the period of time before the exclusion of the item 136 is equal to zero. If not, then the feed content control process 131 proceeds to box 323. Otherwise, the feed content control process 131 proceeds to box 326.

In box 326 the feed content control process 131 determines whether a retail wide sales forecast X' is a threshold improvement over the retail wide sales X for the item 136 during the period of time preceding the period of exclusion. Such a threshold improvement may comprise, for example, an increase in sales by a benchmark such as a 150% increase, a doubling of the sales of the item 136, or other threshold that may be determined as conditions warrant. Assuming that the forecast X' does not represent a threshold improvement as determined in box 326, then the feed content control process 131 proceeds to box 329 and the item 136 remains excluded from the feed 139. Otherwise, the feed content control process 131 proceeds to box 333 in which the respective item 136 is included in the feed 139. Thereafter, the feed content control process 131 progresses to box 329. Thus, in box 326, it is determined whether the sales of a respective item 136 retail wide will improve in the near future such that it may be desirable to try to include the item 136 back into the feed 139.

Assuming that the feed content control process 131 determines that the sales of a respective item 136 is greater than zero, then the feed content control process 131 proceeds to box 323 to determine a proportional sales forecast (B) for those sales expected that will be subject to a referral from the referral network site 143. The proportional sales forecast (B) is determined as a function of the sales (A) subject to the referrals determined in box 309 for the item 136 during the period of time before exclusion, the retail wide sales (X) for the item 136 in the period of time before exclusion determined in box 313, and a retail wide sales forecast for the item 136 in the future.

To this end, the proportional sales forecast B may be calculated as $B=(X')(A)/X$, where Y is a forecast of sales of an item 136 sold retail wide through all channels associated with the electronic commerce system 123, A is the quantity of sales of the item 136 sold subject to a referral from the referral network site 143 during the period of time before the exclusion period, and X is the quantity of an item 136 sold retail wide through all channels associated with the electronic commerce system 123 during the period of time before the exclusion period. Essentially, the proportionality of the actual sales through the channel (referrals) A and the actual sales for all channels X during the period of time before the exclusion of an item 136 is leveraged to determine a forecast of sales of the item 136 (B) relative to the forecast of all sales of the item 136 through all channels associated with the electronic commerce system 123. Note that the proportional sales forecast B may be scaled to take into account situations where there are very few sales to work with that might provide extreme results. For example, if the retail wide sales X is equal to 1, and the retail wide sales forecast X' is equal to 2, then it would be assumed that the percent increase is 100%. However, given that there are two few items 136 sold to provide for statistical significance, the percentage calculated may be weighted depending upon the number of retail wide sales X and/or the retail wide sales forecast X'. Consequently, the 100% increase might be weighted such that it is treated like a 15% difference or other value depending upon the weighting function or curve used.

Thereafter, in box 343, a request for a determination of exclusion may be created and applied to the exclusion process portion of the feed content control process 131 described above with reference to FIG. 3 where the proportional sales forecast (B) is substituted for the prior sales of the item 136 as described above, and where the number of referrals for such item 136 used in the consideration of the functionality of FIG. 3 is taken from the time period before exclusion. Next, in box 346, the request is applied to the exclusion process portion of the feed content control process 131 described above.

In box 329, the feed content control process 131 determines whether the last item 136 of the pool identified in box 303 has been processed. If not, then the feed content control process 131 proceeds to box 349 to identify the next excluded item 136 to consider. Thereafter, the feed content control process 131 reverts back to box 309. Otherwise, the feed content control process 131 ends as shown.

Figure 5:
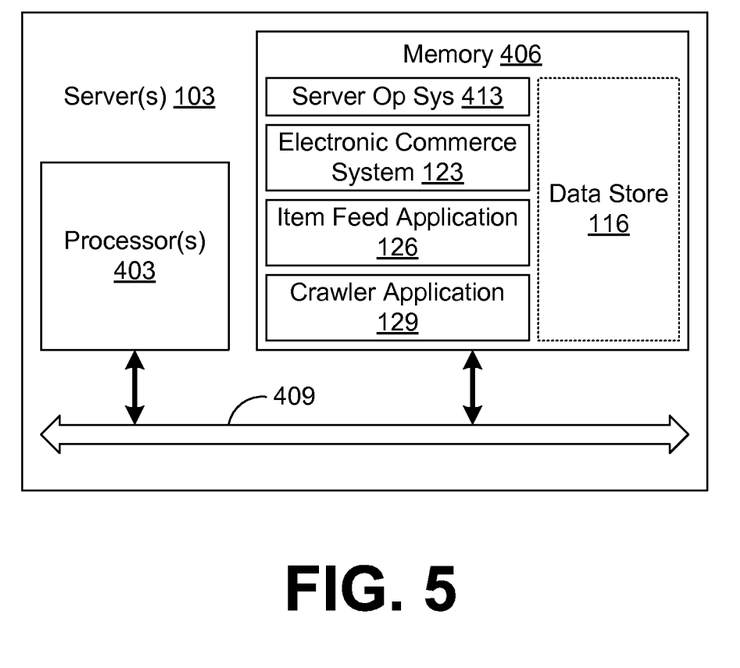
FIG. 5 is a schematic block diagram of one example of one of the servers in the networked environment of FIG. 1 according to an embodiment of the present disclosure.

Referring next to FIG. 5, shown is a schematic block diagram of one example of a server 103 according to an embodiment of the present disclosure. The server 103 includes at least one processor circuit, for example, having a processor 403 and a memory 406, both of which are coupled to a local interface 409. The processor 403 is a solid state device that includes millions of switching elements such as transistors and other elements. The server 103 may comprise, for example, a server computer system or like device as described above. The local interface 409 may comprise, for example, a data bus with an accompanying address/control bus or other bus structure as can be appreciated.

Stored in the memory 406 are both executable applications and/or systems executed by the processor 403 and data. In particular, stored in the memory 406 and executable by the processor 403 are a server operating system 413, the electronic commerce system 123, the item feed application 126 (including the feed content control process 131 (FIG. 1)), the crawler application 129, and potentially other applications and/or systems, etc. Also, stored in the memory 406 is the data store 116 in which are stored the various data items described above so as to be accessible to the processor 403. It is understood that other data may be stored in the memory 406 and accessed by the processors 403 beyond the data described above.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

The various systems, applications, or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as, for example, the electronic commerce system 123, the item feed application 126 (including the feed content control process 131), and the crawler application 129 described above may be embodied in software or code executed by general purpose hardware, as an alternative each may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-4 show the functionality and operation of an implementation of the various applications and/or other components such as, for example, the feed content control process 131 as a portion of the item feed application 126 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications, systems, and/or other components described herein such as, for example, the electronic commerce system 123, the item feed application 126 (including the feed content control process 131), and the crawler application 129 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, semiconductor, or other media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable by at least one computing device, comprising:
    an item feed application configured to periodically send a feed of a subset of a plurality of items to a comparison shopping network site over a network, the items being sold to a plurality of customers through an electronic commerce network site over the network; and
    a feed content control process comprising:
        code that identifies at least one of the items that is excluded from the feed, wherein a period of exclusion is associated with the at least one of the items;
        code that fetches from a data store a site wide forecast of all sales of the at least one of the items through the electronic commerce network site during a predefined period of time prior to the period of exclusion;
        code that fetches a number of sales for the at least one of the items that were subject to a referral from a referral network site during the predefined period of time before the period of exclusion;
        code that generates a forecast of sales through the electronic commerce network site subject to the referral from the referral network site for the at least one of the items based at least in part upon the site wide forecast and the number of sales for the at least one of the items; and
        code that determines whether to reintroduce the at least one of the items into the feed by applying a number of referrals associated with the at least one of the items over the predefined period of time prior to the period of exclusion and the forecast of sales for the at least one of the items to at least one exclusion rule.

2. The non-transitory computer readable medium embodying the program executable by the at least one computing device of claim 1, further comprising code that determines when to execute the feed content control process based at least upon an occurrence of at least one circumstance that renders obsolete a prior determination of exclusion of the at least one of the items from the feed.

3. The non-transitory computer readable medium embodying the program executable by the at least one computing device of claim 2, wherein the at least one of the items further comprises multiple ones of the items.

4. A method, comprising the steps of:
    sending a feed of a subset of a plurality of items sold through an electronic commerce network site implemented in a computing device to a referral network site, the referral network site referring a plurality of customers to the electronic commerce network site;
    identifying in the computing device at least one of the items that is excluded from the feed;
    generating in the computing device a forecast of sales through the electronic commerce network site for the at least one of the items excluded from the feed, the forecast of sales specifying a number of the at least one of the items projected to be sold that are subject to a referral from the referral network site; and
    determining in the computing device whether to include the at least one of the items in the feed based at least in part upon the forecast of sales.

5. The method of claim 4, wherein the step of generating in the computing device the forecast of sales further comprises the step of determining a number of sales for the at least one of the items that were subject to the referral from the referral network site during a predefined period of time before a period of exclusion of the at least one of the items.

6. The method of claim 5, wherein the step of generating in the computing device the forecast of sales further comprises the step of obtaining a number of site wide sales of the at least one of the items through the electronic commerce network site during the predefined period of time before the period of exclusion.

7. The method of claim 6, wherein the step of generating in the computing device the forecast of sales further comprises the step of generating the forecast of sales as a function of both the number of sales for the at least one of the items that were subject to the referral and the site wide sales of the at least one of the items.

8. The method of claim 6, wherein the step of determining in the computing device whether to include the at least one of the items in the feed based at least in part upon the forecast of sales further comprises the step of applying a rate of referrals and the forecast of sales associated with the at least one of the items to at least one exclusion rule to determine whether to reintroduce the at least one of the items to the feed.

9. The method of claim 4, wherein the steps of identifying in the computing device the at least one of the items that is excluded from the feed, generating in the computing device the forecast of sales through the electronic commerce network site for the at least one of the items excluded from the feed, and determining in the computing device whether to include the at least one of the items in the feed based at least in part upon the forecast of sales, are performed at a time before an event to which a prior determination of exclusion of the at least one of the items potentially lacks relevance.

10. A method, comprising the steps of:
    sending a feed of a subset of a plurality of items sold through an electronic commerce network site implemented in a computing device to a referral network site, the referral network site referring a plurality of customers to the electronic commerce network site;
    identifying in the computing device at least one of the items that is excluded from the feed;
    determining in the computing device whether to reintroduce the at least one of the items into the feed as a function of a forecast of sales of the at least one of the items through the electronic commerce network site that are subject to a referral from the referral network site if a total number of sales of the at least one of the items through the electronic commerce network site subject to the referral from the referral network site during a time period before a period of exclusion of the at least one of the items is greater than zero; and determining in the computing device whether to reintroduce the at least one of the items into the feed by considering whether a forecast of site wide sales of the at least one of the items through the electronic commerce network site represents a threshold increase over actual past site wide sales of the at least one of the items during a predefined past period of time if the total number of sales of the at least one of the items is equal to zero.

11. The method of claim 10, wherein the at least one of the items is reintroduced into the feed if the site wide sales of the at least one of the items through the electronic commerce network site represents the threshold increase over actual past sales of the at least one of the items during the predefined past period of time.

12. The method of claim 10, further comprising the step of determining the forecast of sales of the at least one of the items through the electronic commerce network site that are subject to the referral from the referral network site if the total number of sales of the at least one of the items is greater than zero.

13. A system, comprising:
at least one computing device;
an electronic commerce network site implemented in the at least one computing device and configured to sell a plurality of items over a network;
an item feed application implemented in the at least one computing device and configured to send a feed of a subset of the items to a referral network site over the network; and
a feed content control process implemented in the at least one computing device, the feed content control process being configured to:
identify at least one of the items that is excluded from the feed; and
determine whether to reintroduce the at least one of the items into the feed upon an occurrence of at least one sales event that renders obsolete a prior determination of exclusion of the at least one of the items from the feed.

14. The system of claim 13, wherein the feed content control process is configured to determine whether to reintroduce the at least one of the items into the feed by generating a forecast of sales through the electronic commerce network site subject to a referral from the referral network site for the at least one of the items excluded from the feed.

15. The system of claim 14, wherein the feed content control process is configured to generate the forecast of sales by determining a number of sales for the at least one of the items that were subject to the referral from the referral network site during a predefined period of time before a period of exclusion of the at least one of the items.

16. The system of claim 15, wherein the feed content control process is further configured to generate the forecast of sales by obtaining a site wide forecast of all sales of the at least one of the items through the electronic commerce network site during the predefined period of time before the period of exclusion.

17. The system of claim 16, wherein the feed content control process is further configured to generate the forecast of sales as a function of both the number of sales for the at least one of the items that were subject to the referral and the site wide forecast of all sales.

18. The system of claim 16, wherein the feed content control process is further configured to determine whether to reintroduce the at least one of the items into the feed by applying a rate of referrals and the forecast of sales associated with the at least one of the items to at least one exclusion rule.

19. The system of claim 13, wherein the referral network site is configured to provide for comparison shopping.

20. The system of claim 13, wherein the at least one of the items further comprises multiple ones of the items, wherein the feed content control process is configured to individually determine whether to reintroduce each one of the multiple ones of the items into the feed.

* * * * *